(12) United States Patent
Wang et al.

(10) Patent No.: US 12,475,043 B2
(45) Date of Patent: Nov. 18, 2025

(54) IN-MEMORY GARBAGE COLLECTION

(71) Applicant: SK hynix Inc., Gyeonggi-do (KR)

(72) Inventors: Haobo Wang, San Jose, CA (US); Fan Zhang, Fremont, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/415,427

(22) Filed: Jan. 17, 2024

(65) Prior Publication Data

US 2025/0231873 A1 Jul. 17, 2025

(51) Int. Cl.
*G06F 16/00* (2019.01)
*G06F 12/02* (2006.01)
*G06F 16/27* (2019.01)
*H03M 13/11* (2006.01)

(52) U.S. Cl.
CPC ........ *G06F 12/0253* (2013.01); *G06F 16/273* (2019.01); *H03M 13/1102* (2013.01)

(58) Field of Classification Search
CPC .................................................... G06F 16/273
USPC ......................................................... 707/813
See application file for complete search history.

(56) References Cited

U.S. PATENT DOCUMENTS

| | | | |
|---|---|---|---|
| 7,562,181 B2 | 7/2009 | Sinclair et al. | |
| 8,386,700 B2 | 2/2013 | Olbrich et al. | |
| 9,105,333 B1 | 8/2015 | Hu et al. | |
| 9,448,743 B2 | 9/2016 | Prins et al. | |
| 10,185,657 B2 | 1/2019 | Zhang et al. | |
| 10,445,229 B1* | 10/2019 | Kuzmin | G06F 3/061 |
| 10,671,317 B2 | 6/2020 | Shahidi et al. | |
| 11,157,402 B2 | 10/2021 | Lee | |
| 2014/0237168 A1* | 8/2014 | Prins | G11C 16/10 |
| | | | 711/103 |
| 2020/0081833 A1* | 3/2020 | Lee | G06F 12/0246 |
| 2021/0182190 A1 | 6/2021 | Gao et al. | |
| 2022/0334967 A1 | 10/2022 | Galbraith et al. | |

FOREIGN PATENT DOCUMENTS

| | | |
|---|---|---|
| CN | 115391237 A | 11/2022 |
| EP | 2160686 B1 | 10/2012 |
| KR | 101179027 B1 | 8/2012 |

* cited by examiner

*Primary Examiner* — Chelcie L Daye
(74) *Attorney, Agent, or Firm* — Weaver Austin Villeneuve & Sampson LLP

(57) ABSTRACT

A memory device of a storage device may receive a garbage collection command from a memory controller coupled to the memory device to perform an internal garbage collection operation within the memory device. The memory device may attempt to perform the garbage collection operation to internally move valid memory pages from a first memory block to a second memory block to free up the first memory block in response to the garbage collection command. The memory device may send an acknowledgement to the memory controller for the garbage collection command.

19 Claims, 8 Drawing Sheets

IN-MEMORY GARBAGE COLLECTION

BACKGROUND

Garbage collection is a memory management function in storage devices that can be periodically performed by a memory controller in the storage device to optimize the use of the memory. Garbage collection generally includes relocating valid data from partially filled memory blocks in the memory to free up those memory blocks to store new data. In most cases, the valid data is moved from a partially filled memory block to a new memory block, and the old memory block is deallocated to be ready for writing the new valid data.

BRIEF SUMMARY

Techniques to perform an internal garbage collection operation within a memory device are described. The memory device is coupled to a memory controller in the storage device. According to some embodiments, a garbage collection command is received by the memory device from the memory controller to perform an internal garbage collection operation within the memory device. The garbage collection operation is performed by the memory device to internally move valid memory pages from a first memory block to a second memory block to free up the first memory block in response to receiving the garbage collection command. An acknowledgement is sent by the memory device to the memory controller for the garbage collection command. The acknowledgement to the memory controller includes an indication whether the garbage collection was performed successfully.

According to some embodiments, the garbage collection operation is performed internally by the memory device by reading data from the valid memory pages in the first memory block, performing error correction on the data by an internal error correction code (ECC) engine, and writing the corrected data internally to the second memory block. In some embodiments, the garbage collection operation is performed internally in the memory device by reading data from the valid memory pages in the first memory block, determining that a checksum metric of the valid memory pages is below a threshold value, and writing the data to the second memory block if the checksum metric is below the threshold value. If checksum metric of the valid memory pages is above the threshold value, the memory device can request the memory controller to perform the garbage collection operation. According to some embodiments, the request can be provided in the acknowledgement. The memory controller can read the data from the valid memory pages in the first memory block in response to the request, perform error correction on the data, and write the corrected data to the second memory block.

According to some embodiments, a storage device may include a memory device and a memory controller coupled to the memory device. The memory controller includes a garbage collection module operable to send a garbage collection command to the memory device to perform an internal garbage collection operation within the memory device. The memory device includes internal garbage collection logic operable to receive the garbage collection command from the memory controller. The internal garbage collection logic is further operable to attempt the garbage collection operation to internally move valid memory pages from a first memory block to a second memory block to free up the first memory block in response to the garbage collection command. The internal garbage collection logic is further operable to send an acknowledgement to the memory controller for the garbage collection command.

BRIEF DESCRIPTION OF THE DRAWINGS

Various embodiments in accordance with the present disclosure will be described with reference to the drawings, in which.

DETAILED DESCRIPTION

Figure 1:
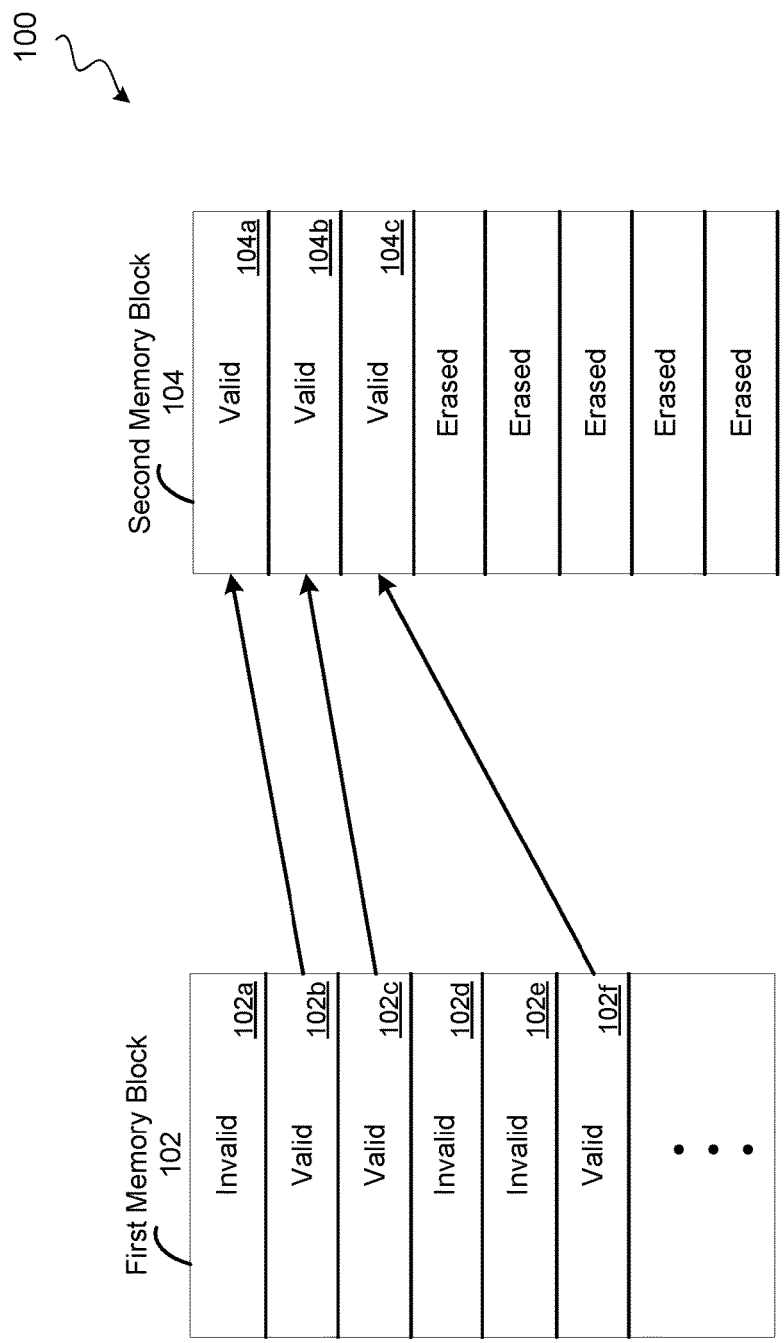
FIG. 1 illustrates an example of a garbage collection operation to move valid memory pages from a first memory block to a second memory block.

Data storage devices, such as solid-state storage devices, may include multiple memory dies, and each memory die may be organized into a plurality of memory blocks. Each memory block may include multiple memory pages. Generally, when a data storage device is written with data (e.g., files or other chunks of data) into memory pages, the data may not always align with the memory block based on the size of the data being written. Thus, in most cases, a large number of memory blocks may be partially filled with valid memory pages, and each of those partially filled memory blocks may include invalid (unused or fractured) empty space that may not be usable, which may not be the most efficient use of the memory. Some data storage devices, such as, flash memory, may not support overwriting existing data directly in the memory, and, therefore, the existing data has to be erased before the new data can be written to the same memory locations. Furthermore, the erase operation may have to be performed at the block level. Generally, the valid memory pages are relocated from an old memory block to a new memory block before the old memory block can be erased to be usable again.

Garbage collection operation is a memory management function that may be performed by a memory controller of the storage device to consolidate the data from the valid memory pages of a partially filled memory block into a new memory block. Thus, combining valid memory pages from partially filled memory blocks into one or more new memory blocks can eliminate fractured empty spaces, and free up those partially filled memory blocks to store new data in an efficient manner. Generally, the firmware executing on the memory controller may trigger the garbage collection operation and instruct the memory controller to read the valid data from the old memory block in the memory device. The data is transferred from the memory device to the memory controller. The memory controller may then perform error correction decoding on the data read from the old memory block, and write the error-free data to the new memory block in the memory device. The old memory block can be deallocated or erased to free-up the memory space for the new write operations.

The garbage collection operation can help with the memory management of the memory device, but may cause some performance drawbacks. When there are large numbers of partially filled or invalid memory pages, writing to the memory device may cause garbage collision. The write operation will trigger the garbage collection operation, resulting in multiple data transfers between the memory controller and the memory device to move data between memory blocks. The garbage collection process may consume considerable amount of hardware resources, and may collide with write operations impacting the throughput of the storage device.

The garbage collection operation can cause write amplification since each write operation to the memory device may get translated to multiple write operations. In some examples, the write amplification can be around 5 due to the data for the valid memory pages being moved around multiple times between the memory controller and the memory device during the lifetime of the data. When the memory pages are first written into a memory block, it may create invalid memory space in the memory block which remains unused or empty. Thus, the memory controller may perform a read operation to read the valid memory pages, correct the errors on the data for the valid memory pages using an error correction code (ECC) engine, consolidate the valid memory pages from multiple memory blocks, and then perform the write operation to write the error corrected valid memory pages to a new memory block. Furthermore, garbage collection operations can collide with the normal write operations to the memory device, which can impact the throughput and the QoS of the storage device. Thus, to alleviate the impact of garbage collection, it is desirable to reduce the write amplification, as well as frequent data movement between the memory device and the memory controller.

Techniques described herein can be used to reduce the write amplification by performing an internal garbage collection operation within the memory device. When the memory controller firmware determines that the garbage collection operation needs to be performed, the memory controller may send a customized garbage collection command to the memory device to move data for the valid memory pages (or valid data) from a first memory block (e.g., old memory block) to a second memory block (e.g., new memory block). The memory device may attempt to move the valid data internally from the first memory block to the second memory block without needing to transfer the valid data to the memory controller for error correction. The memory device may also send an acknowledgement to the memory controller in response to the garbage collection command. The acknowledgement to the memory controller may include an indication whether the garbage collection was performed successfully.

In some embodiments, the memory device may include an internal ECC engine that can be used to correct errors on the valid data read from the first memory block. The corrected data can be written internally to the second memory block. In some implementations, to minimize the amount of additional circuitry, the internal ECC engine may be a lightweight ECC engine with an error correction capability that is less than the ECC engine in the memory controller. For example, the lightweight ECC engine can be capable of correcting fewer number of error bits than the memory controller, performing fewer iterations of decoding, and/or employing less complex decoding algorithms. By having an internal ECC engine in the memory device, data movement for the garbage collection can occur within the memory device, and, therefore, write amplification of 1 can be achieved since the valid data does not need to be transferred to and from the memory controller to perform garbage collection.

In some embodiments, to further minimize the amount of additional circuitry, internal checksum logic can be used instead of an internal ECC engine. The internal checksum logic can determine the number of error bits, but may lack the capability to correct errors. In such implementation, the memory device may move the valid data internally from the first memory block to the second memory block when a checksum metric of the valid data read from the first memory block is below a threshold value. The checksum metric can be determined by the memory device using the internal checksum logic by computing a checksum for each valid memory page. The threshold value can be based on the number of parity bits in a low-density parity check (LDPC) codeword used by the storage device. If the checksum metric of the valid data read from the first memory block is above the threshold value, the memory device may request the memory controller to perform the garbage collection operation. The request can be provided in the acknowledgement sent to the memory controller. In response, the memory controller may read the valid data from the first memory block, perform error correction on the valid data using the ECC engine in the memory controller, and write the corrected valid data to the second memory block. In implementations employing the internal checksum logic, the write amplification may be higher than 1, but it may still be less than 5.

Thus, in various embodiments, use of internal ECC engine and/or the checksum logic can carry out the garbage collection operation with internal data movement within the memory device to reduce or eliminate data transfers with the memory controller. This can lower the write amplification to improve the performance and the QoS of the storage device for the garbage collection process.

FIG. 1 illustrates an example of a garbage collection operation 100 to move valid memory pages from a first memory block 102 to a second memory block 104.

As shown in FIG. 1, the first memory block 102 may include a plurality of memory pages comprising memory pages 102a, 102b, 102c, 102d, 102e, and 102f. In some examples, the memory pages 102b, 102c, and 102f may include valid data, or alternatively be called valid memory pages. The remaining memory pages of the first memory block 102 including the memory pages 102a, 102d, and 102f may not contain any data, or may be called invalid, unused, or empty memory pages. Thus, the first memory block 102 is a partially filled memory block since only some of the memory pages include valid data.

The second memory block 104 can be a memory block that has been erased and is available to store new data. The garbage collection operation may move or copy the valid pages 102b, 102c, and 102f from the first memory block 102 to the second memory block 104 as valid pages 104a, 104b, and 104c, respectively. The garbage collection operation may concatenate the valid pages 102b, 102c, and 102f when writing to the second memory block 104 to efficiently utilize the available memory space. Once the valid pages 102b, 102c, and 102f are copied into the second memory block 104, the first memory block 102 can be deallocated and erased to make it available for writing new data.

Figure 2:
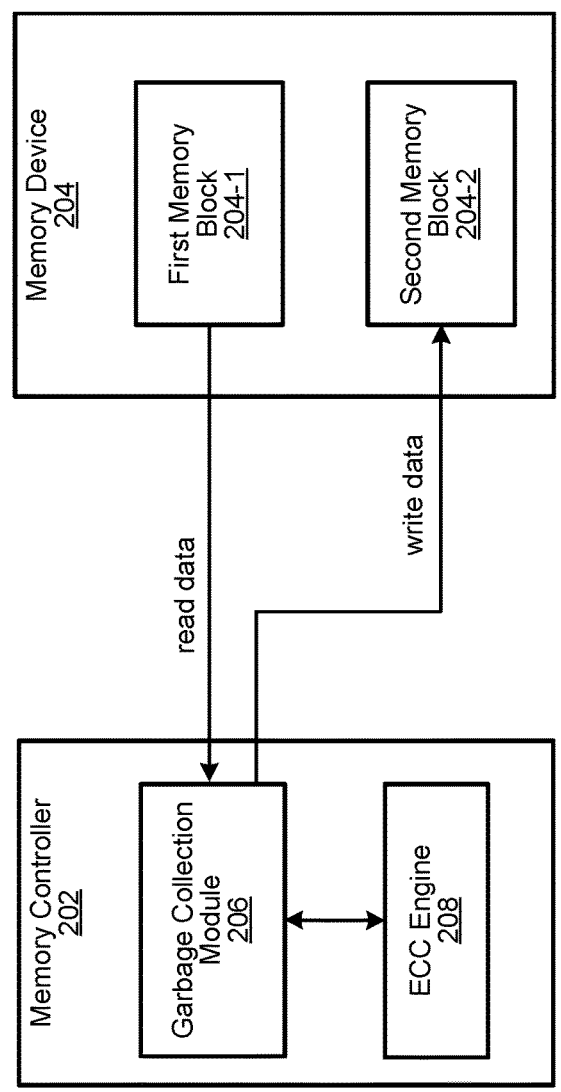
FIG. 2 illustrates an example of a storage device comprising a memory device coupled to a memory controller operable to perform a garbage collection operation.

FIG. 2 illustrates an example of a storage device 200 comprising a memory device 204 coupled to a memory controller 202 operable to perform a garbage collection operation.

The memory controller 202 may include a garbage collection module 206 and an ECC engine 208. In some implementations, the ECC engine 208 may be a high precision engine that can perform error correction decoding based on a low-density parity-check (LDPC) code. The LDPC code can use up to M number of parity bits, where M is a pre-determined number based on the implementation. In some implementations, the ECC engine 208 may include multiple decoders that employ different decoding algorithms (e.g., bit-flipping, min-sum, etc.).

The memory controller 202 may also include one or more processors (not shown) that can be configured to execute instructions stored in a computer readable medium. For example, the memory controller 202 may execute firmware that may be operable to manage read/write accesses to the memory device 204, and communicate with a host device, among other tasks. In some embodiments, the firmware may also be operable to determine that a garbage collection operation needs to be performed on the memory device 204 based on a certain trigger. For example, a trigger may be generated when a number of empty memory blocks available to write new data falls below a predefined value, or a number of partially filled blocks exceeds a certain threshold. However, any suitable condition can be used to trigger the garbage collection process without deviating from the scope of the disclosure.

In some implementations, the garbage collection module 206 may be operable to determine that a garbage collection operation is to be performed to move valid memory pages from a first memory block 204-1 to a second memory block 204-2 based on the trigger. In some examples, the first memory block 204-1 and the second memory block 204-2 can be the first memory block 102 and the second memory block 104, respectively. Thus, the garbage collection module 206 may read the data from the valid memory pages 102b, 102c, and 102f in the first memory block 204-1. The garbage collection module 206 may then perform error correction on the data for the valid memory pages 102b, 102c, and 102f using the ECC engine 208, and write the corrected data to the second memory block 204-2. For example, the corrected data may be written as the valid memory pages 104a, 104b, and 104c in the second memory block 204-2.

As described previously, the garbage collection process may consume hardware resources to read the data from the first memory block 204-1, temporarily store the data in a local buffer, perform the error correction, and write the corrected data in the second memory block 204-2. Additionally, reading the data from the first memory block 204-1, and writing the corrected data in the second memory block 204-2 may involve multiple write operations that can increase the write amplification related to the garbage collection, and impact the performance. Furthermore, the data transfer for the garbage collection operation may interfere with other write operations to the memory device 204 because the memory interface between the memory controller 202 and memory device 204 is taken up during the garbage collection operation, which can impact the throughput and the QoS of the storage device 200.

Some embodiments can be used to alleviate the impact of garbage collection operation on the performance of a storage device, and reduce the write amplification by performing an internal garbage collection operation within the memory device. This is further described with reference to FIG. 3.

Figure 3:
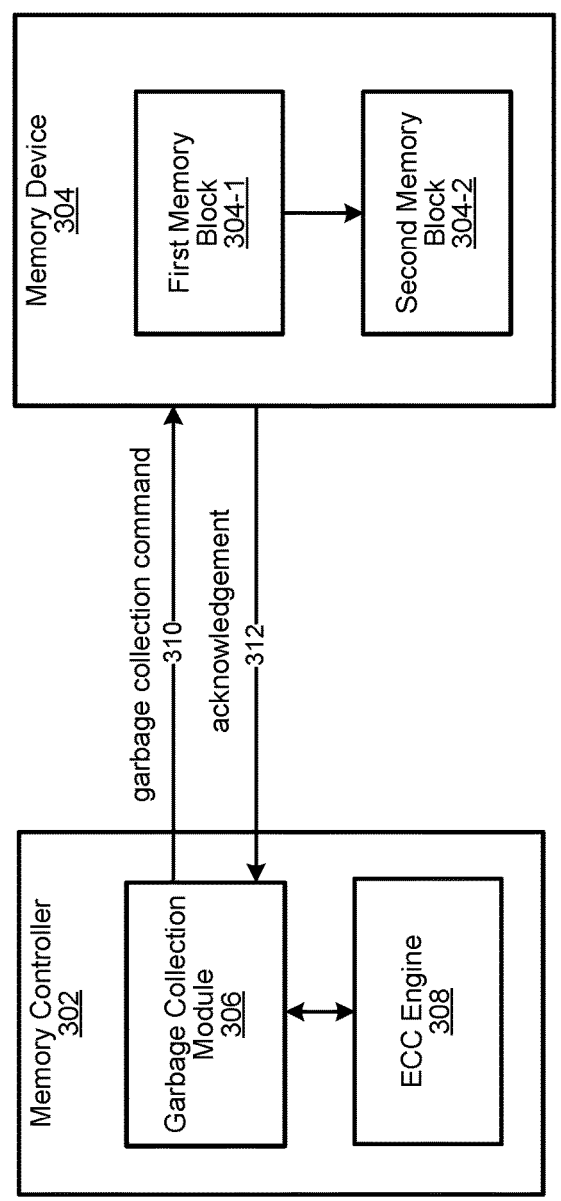
FIG. 3 illustrates a storage device comprising a memory controller coupled to a memory device operable to perform an internal garbage collection operation, according to some embodiments.

FIG. 3 illustrates a storage device 300 comprising a memory controller 302 coupled to a memory device 304 operable to perform an internal garbage collection operation, according to some embodiments.

The memory controller 302 may include a garbage collection module 306 and an ECC engine 308. The ECC engine 308 may be the same as the ECC engine 208 in FIG. 2. The memory controller 302 may also include one or more processors (not shown) that can be configured to execute instructions stored in a computer readable medium. For example, the memory controller 302 may execute firmware that may be operable to manage read/write accesses to the memory device 304, and communicate with a host device, among other tasks. In some embodiments, the firmware may also be operable to determine that a garbage collection operation needs to be performed on the memory device 304 based on a certain trigger, as described with reference to the memory controller 202.

In some embodiments, the garbage collection module 306 may be operable to send a customized garbage collection command 310 to the memory device 304 with instructions to perform an internal garbage collection operation within the memory device 304 by moving the data for the valid memory pages from a source memory block to a destination memory block. In some implementations, the garbage collection command 310 may include memory address, offsets, pointers, or any information that can be used to identify a first memory block 304-1 as the source memory block from where the valid memory pages can be read, and a second memory block 304-2 as the destination memory block where the valid memory pages can be copied to. As an example, the first memory block 304-1 and the second memory block 304-2 can be the same as the first memory block 102 and the second memory block 104, respectively.

The memory device 304 may be operable to receive the garbage collection command 310 from the memory controller 302 to perform the internal garbage collection operation within the memory device 304. The memory device 304 may be further operable to attempt to perform the garbage collection operation to internally move valid memory pages from the first memory block 304-1 to the second memory block 304-2 to free up the first memory block 304-1 in response to the garbage collection command 310. The memory device 304 may be further operable to send an acknowledgement 312 to the memory controller 302 for the garbage collection command 310. The acknowledgement 312 may include an indication whether the garbage collection was performed successfully.

In some embodiments, the memory device 304 may attempt to perform the garbage collection operation internally by reading data from the valid memory pages in the first memory block 304-1, and performing error correction on the data using an internal ECC engine. The internal ECC engine may be a lightweight ECC engine that has a lower error correction capability than the ECC engine 308. The memory device 304 may be further operable to write the corrected data internally to the second memory block 304-2.

In some embodiments, attempting to perform the garbage collection operation by the memory device 304 may include determining whether a checksum metric of the valid memory pages read from the first memory block 304-1 is above a threshold value. The threshold value may be determined based on the number of parity bits in a LDPC codeword used by the storage device 300. In some implementations, the threshold value may be determined by the firmware executing on the memory controller 302. By way of example, the memory device 304 may determine the checksum metric of the valid memory pages by taking an average of checksums corresponding to the valid memory pages, or by identifying a maximum checksum from the checksums corresponding to the valid memory pages.

The memory device 304 may write the corrected data internally to the second memory block 304-2 if the checksum metric of the valid memory pages read from the first memory block 304-1 is below the threshold value. This may indicate that the valid memory pages contain a small or negligible number of errors, which can be corrected by the memory controller 302 using the EEC engine 308 without difficulty when a subsequent read operation is performed to read the second memory block 304-2. Thus, the valid memory pages that contain a small amount of error can be moved for the internal garbage collection operation without going through the memory controller 302.

If the memory device 304 determines that the checksum metric of the valid memory pages read from the first memory block 304-1 is above the threshold value, the memory device 304 may send a request in the acknowledgement 312 to the memory controller 302 to perform the garbage collection operation. Upon receiving the request, the memory controller 302 may read the data from the valid memory pages in the first memory block 304-1, perform error correction on the data using the ECC engine 308, and write the corrected data to the second memory block 304-2, as described with reference to FIG. 2.

Figure 4:
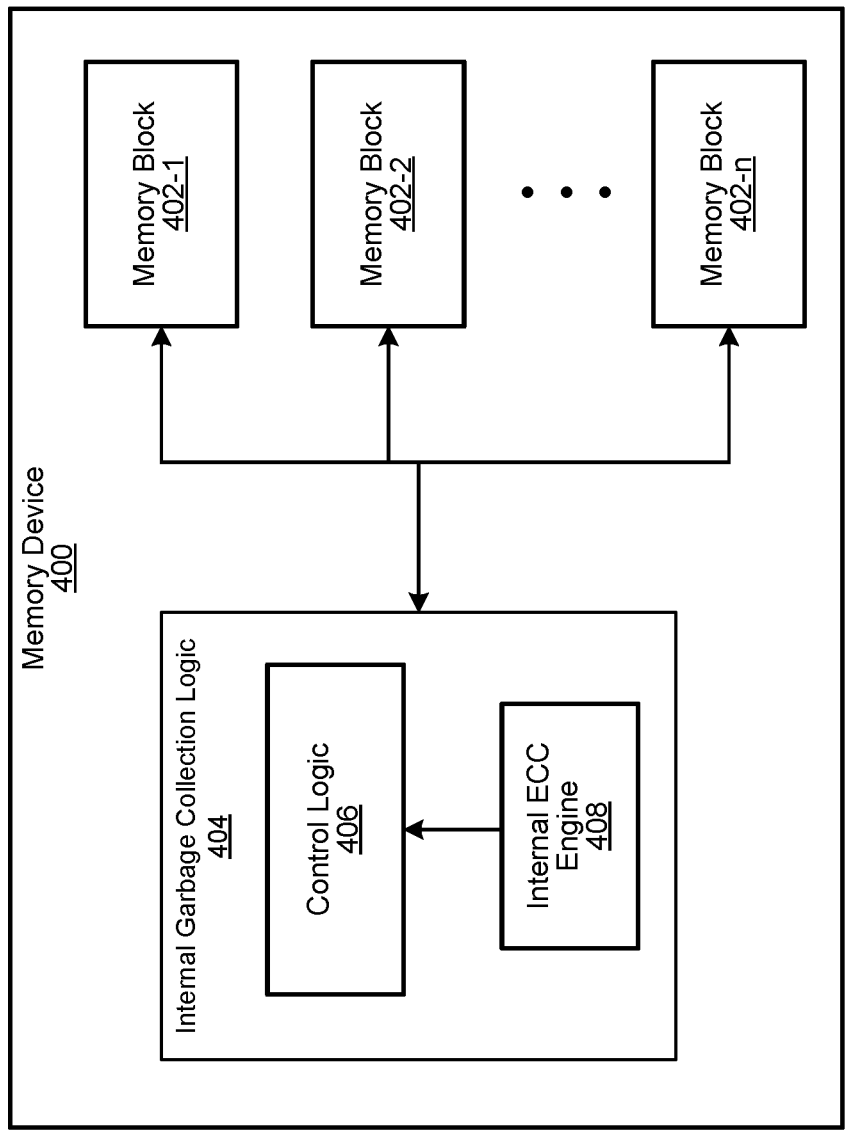
FIG. 4 illustrates a block diagram of an example of a memory device that is operable to perform an internal garbage collection operation using an internal error correction code (ECC) engine, according to some embodiments.

FIG. 4 illustrates an example block diagram of a memory device 400 that is operable to perform an internal garbage collection operation using an internal ECC engine, according to some embodiments. The memory device 400 can be an example of the memory device 304 that is coupled to the memory controller 302 in the storage device 300. In some examples, the memory device 400 may include a flash memory (e.g., NAND flash) comprising one or more memory dies. Each memory die may include a plurality of memory blocks, and each memory block may include a plurality of memory pages.

The exemplary memory device 400 may include an N number of memory blocks comprising memory blocks 402-1, 402-2, and 402-n. As an example, the memory block 402-1 can be the first memory block 304-1 and the memory block 402-2 can be the second memory block 304-2. The N number of memory blocks may be arranged in any suitable configuration based on the type of the flash memory. The memory device 400 may also include an internal garbage collection logic 404 comprising control logic 406, and an internal ECC engine 408. The internal ECC engine 408 may be a lightweight ECC engine that has a lower error correction capability than the ECC engine 308. The control logic 406 may be operable to communicate with the memory controller 302. For example, the control logic 406 may be operable to receive the garbage collection command 310 from the memory controller 302, and send the acknowledgement 312 to the memory controller 312.

The control logic 406 may be further operable to attempt to perform the garbage collection operation to internally move valid memory pages from the memory block 402-1 to the memory block 402-2 in response to the garbage collection command 310. For example, the garbage collection command 310 may include information to identify the memory block 402-1 as the source memory block, and the memory block 402-2 as the destination memory block. The control logic 406 may be further operable to perform the garbage collection operation internally by reading data from the valid memory pages in the memory block 402-1. In some implementations, the data read from the memory block 402-1 may be temporarily stored in a local buffer (not shown) inside the internal garbage collection logic 404. The internal ECC engine 408 may perform error correction on the temporarily stored data in the buffer and provide corrected data. The internal garbage collection logic 404 may write the corrected data to the second memory block 402-2.

In some embodiments, the memory device 400 may perform the internal garbage collection operation based on a checksum metric computed from the valid memory pages read from the memory block 402-1. This is described with reference to FIG. 5.

Figure 5:
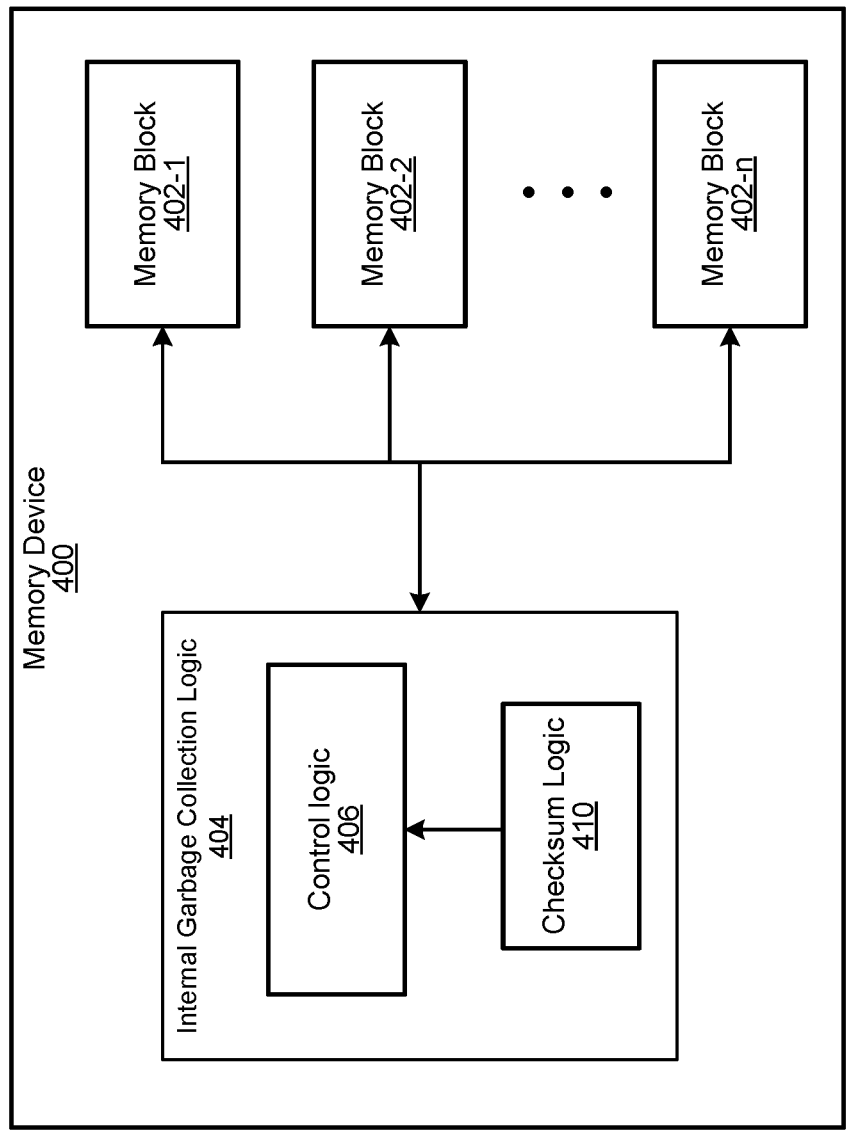
FIG. 5 illustrates a block diagram of an example of a memory device that is operable to perform internal garbage collection operation using internal checksum logic, according to some embodiments.

FIG. 5 illustrates an example block diagram of the memory device 400 that is operable to perform internal garbage collection operation using checksum logic, according to some embodiments.

In some embodiments, the internal garbage collection module 404 may include checksum logic 410 in place of the internal ECC engine 408. The checksum logic 410 may be used to determine a checksum metric of the valid memory pages read from the memory block 402-1. The checksum logic 410 may be operable to compute a checksum (or syndrome weight) corresponding to each valid memory page in the memory block 402-1. In some embodiments, the checksum logic 410 may determine the checksum metric by taking an average of all the computed checksums. In some embodiments, the checksum logic 410 may determine the checksum metric by identifying a maximum checksum of the computed checksums corresponding to the valid memory pages. The control logic 406 may determine whether the checksum metric of the valid memory pages is below a threshold value. The threshold value may be determined based on the number of parity bits in a LDPC codeword used by the storage device. For example, the threshold value can be 5% of the number of parity bits in the LDPC codeword.

The control logic 406 may be further operable to compare the checksum metric computed by the checksum logic 410 with the threshold value. In some embodiments, the control logic 406 may allow writing the valid memory pages to the memory block 402-2 if the checksum metric is below the threshold value. In some examples, if the valid memory pages written to the memory block 402-2 has a small amount of error, the memory controller 302 may correct the errors when performing a subsequent read operation of the memory block 402-2.

If the control logic 406 determines that the checksum metric is above the threshold value, the control logic 406 may include an indication in the acknowledgement 312 to request the memory controller 302 to perform the garbage collection operation. In some implementations, the control logic 406 may enable a bit/flag that generates an interrupt to the memory controller 302 to request the memory controller 302 to perform the garbage collection operation on the memory block 402-1. Thus, in scenarios when the checksum metric is above the threshold value, the memory controller 302 may perform a read operation of the memory device 400 to read the valid memory pages from the memory block 402-1, perform error correction on the data read from the valid memory pages using the ECC engine 308, and write the corrected data to the memory block 402-2, using a similar process as described with reference to FIG. 2.

In some embodiments, the internal garbage collection logic 404 may include both the internal ECC engine 408 and the checksum logic 410, and the memory device 400 may be configured to use either the internal ECC engine 408 or the checksum logic 410, or both. As an example, different levels of thresholds may be used to determine whether to perform the internal garbage collection operation within the memory device 400, or request the memory controller 302 to perform the garbage collection operation. For example, if the checksum metric is below a first threshold level, the valid memory pages read from the memory block 402-1 can be written to the memory block 402-2. If the checksum metric is between the first threshold level and a second threshold level, the valid memory pages read from the memory block 402-1 can be corrected using the internal ECC engine 408 and the corrected data can be written to the memory block 402-2. If the checksum metric is above the second threshold level, the control logic 406 can request the memory controller 302 to perform the garbage collection, as described previously. However, other implementations are also possible to utilize the internal garbage collection operation in an efficient manner to maintain a high QoS and performance of the storage device.

Figure 6:
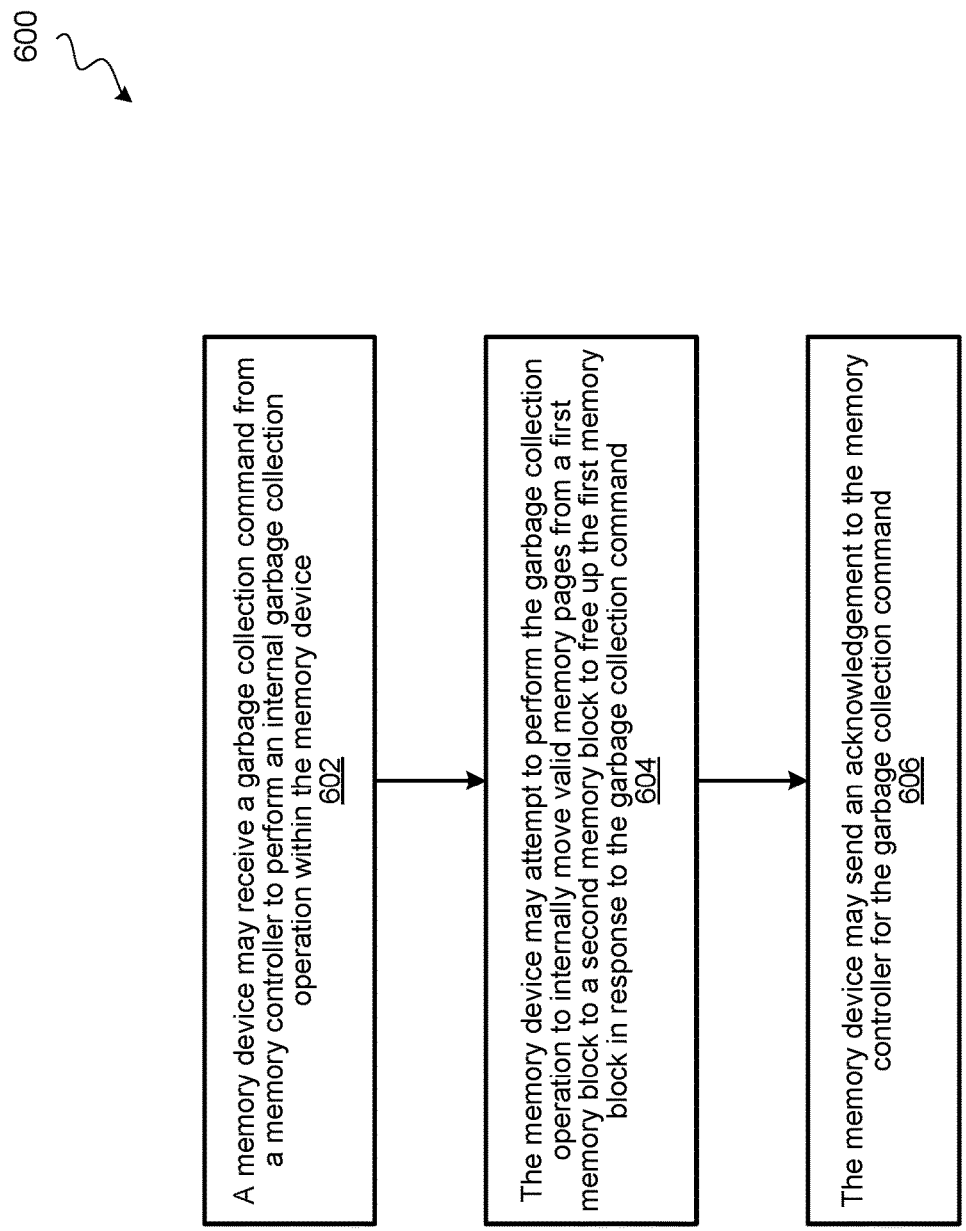
FIG. 6 illustrates a flow diagram of an example of a process performed by a memory device of a storage device for an in-memory garbage collection operation, according to some embodiments.

FIG. 6 illustrates a flow diagram of an example of a process 600 performed by a memory device of a storage device for an in-memory garbage collection operation, according to some embodiments. For example, the process 600 may be performed by the memory device 304 or memory device 400.

Process 600 may begin at block 602 by receiving a garbage collection command from the memory controller to perform an internal garbage collection operation within the memory device. As an example, internal garbage collection logic 404 in the memory device 304 may receive the garbage collection command 310 from the memory controller 302 to perform an internal garbage collection operation within the memory device 304. The garbage collection command 310 may include instructions for the memory device 304 to perform the internal garbage collection operation by moving valid memory pages from a source memory block to a destination memory block. The instructions may include information (e.g., memory address, offset, pointers, etc.) to identify the memory block 402-1 as the source memory block, and the memory block 402-2 as the destination memory block. As an example, the memory block 402-1 can be the first memory block 102 comprising the valid memory pages 102b, 102c, and 102f, and the memory block 402-2 can be the second memory block 104.

At block 604, the memory device may attempt to perform the garbage collection operation to internally move valid memory pages from a first memory block to a second memory block to free up the first memory block in response to the garbage collection command. As described with reference to FIG. 4, the internal garbage collection logic 404 may read the data for the valid memory pages in the memory block 402-1 and temporarily store the data in a local buffer in the internal garbage collection logic 404. In some examples, the memory device 400 may use the internal ECC engine 408 to perform error correction on the temporarily stored data in the buffer and provide corrected data. The internal garbage collection logic 404 may be further operable to write the corrected data to the second memory block 402-2.

In some examples, the garbage collection operation may be performed internally in the memory device 400 by reading data from the valid memory pages in the memory block 402-1 and determining whether a checksum metric of the valid memory pages is below a threshold value. For example, the internal garbage collection logic 404 may compare a checksum metric of the valid memory pages with a threshold value, and write the data for the valid memory pages to the memory block 402-2 if the checksum metric is below the threshold value. As an example, the checksum metric may be determined by taking an average of the checksums corresponding to the valid memory pages computed by the checksum logic 410, or identifying a maximum checksum from the checksums.

At block 606, the memory device may send an acknowledgement to the memory controller for the garbage collection command. For example, the internal garbage collection logic 404 may send the acknowledgement 312 to the memory controller 302 in response to the garbage collection command 310. The acknowledgement 312 may include an indication that the garbage collection was performed successfully.

In some examples, attempting to perform the garbage collection operation may include reading data from the valid memory pages in the memory block 402-1, and determining that a checksum metric of the valid memory pages is above a threshold value. The internal garbage collection logic 404 may determine that the checksum metric is above the threshold value, and send a request in the acknowledgement 312 to have the memory controller 302 perform the garbage collection operation. In response to the acknowledgement 312, the memory controller 302 may read the data from the valid memory pages in the memory block 402-1, perform error correction on the data using the ECC engine 308, and write the corrected data to the memory block 402-2.

In some examples, the memory device 400 may use the internal ECC engine 408 to correct the data for the valid memory pages if the checksum metric is above a first threshold level but below a second threshold level. If the checksum metric is above the second threshold level, the control logic 406 may send a request in the acknowledgement 312 to the memory controller 302 to perform the garbage collection operation, as described above.

Techniques described herein can be used to perform an internal garbage collection operation within the memory device based on a customized command from the memory controller. In various embodiments, use of an internal ECC engine and/or the checksum logic in the memory device can ensure that the internal data movement from an old memory block to a new memory block can be performed within the memory device without corrupting the valid data. The in-memory garbage collection operation performed by the memory device can reduce the write amplification significantly, while maintaining the performance and the QoS of the storage device during the garbage collection process.

Figure 7:
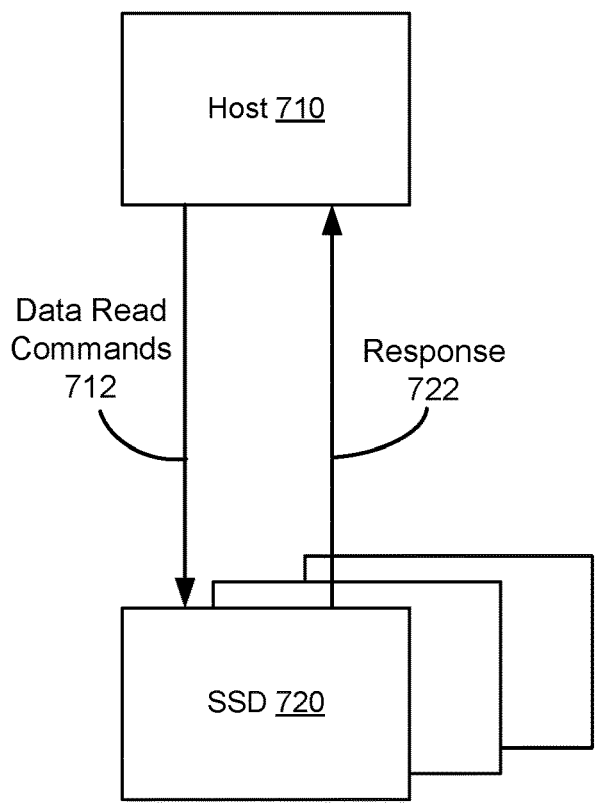
FIG. 7 illustrates a simplified block diagram of a computing system, according to some embodiments.

FIG. 7 illustrates an example architecture of a computing system 700, in accordance with certain embodiments of the present disclosure. In an example, the computer system 700 includes a host 710 and one or more solid state drives (SSDs) 720. The host 710 stores data on behalf of clients, e.g., the SSDs 720. The data is stored in an SSD as codewords for ECC protection. For instance, the SSD can include an error correction system comprising one or more ECC encoders. In some embodiments, the SSD 720 can be an example of the storage device 300.

The host 710 can receive a request from a client for the client's data stored in the SSDs 720. In response, the host sends data read commands 712 to the SSDs 720 as applicable. Each of the SSDs 720 processes the received data read command and sends a response 722 to the host 710 upon completion of the processing. The response 722 can include the read data and/or a decoding failure. In an example, each of the SSDs includes at least one ECC decoder. Further, at least one of the SSDs 720 may include a BF decoder. In particular, some or all of the SSDs 720 may include a BF decoder that takes into account information about unreliable check nodes when deciding whether to flip the bit-value of a variable node, where the information about unreliable check nodes is determined through building a set of unreliable check nodes using the techniques described below.

Processing the data read command and sending the response 722 includes decoding by the ECC decoder(s) the codewords stored in the SSD to output the read data and/or the decoding failure. Some of the codewords may be decoded by a BF decoder, or some other decoding technique applied to circulant submatrices.

In an example where an SSD 720 includes a BF decoder and one or more additional ECC decoders, the SSD may be configured to attempt an initial decoding of its stored codewords using the BF decoder. The one or more additional ECC decoders can remain inactive while the BF decoder is decoding. If the decoding by the BF decoder is unsuccessful, the SSD may select one of the additional ECC decoders (e.g., based on a hierarchical order) for performing decoding. Thus, the one or more additional ECC decoders may act as backup decoders in the event that the BF decoder cannot fully decode a codeword. A backup decoder need not process all the codewords input to the BF decoder. Instead, in some examples, the input to a backup decoder is a subset of the input to a previously selected decoder, where the subset corresponds to codewords that the previously selected decoder failed to fully decode. Further, some of the additional ECC decoders may be operated in parallel with the BF decoder to perform parallel processing of codewords.

Generally, an SSD can be a storage device that stores data persistently or caches data temporarily in nonvolatile semiconductor memory and is intended for use in storage systems, servers (e.g., within datacenters), and direct-attached storage (DAS) devices. A growing number of applications need high data throughput and low transaction latency, and SSDs are used as a viable storage solution to increase performance, efficiency, and reliability. SSDs generally use NAND flash memory and deliver higher performance and consume less power than spinning hard-disk drives (HDDs). NAND Flash memory has a number of inherent issues associated with it, the two most important include a finite life expectancy as NAND Flash cells wear out during repeated writes, and a naturally occurring error rate. SSDs can be designed and manufactured according to a set of industry standards that define particular performance specifications, including latency specifications, to support heavier write workloads, more extreme environmental conditions and recovery from a higher bit error rate (BER) than a client SSD (e.g., personal computers, laptops, and tablet computers).

Figure 8:
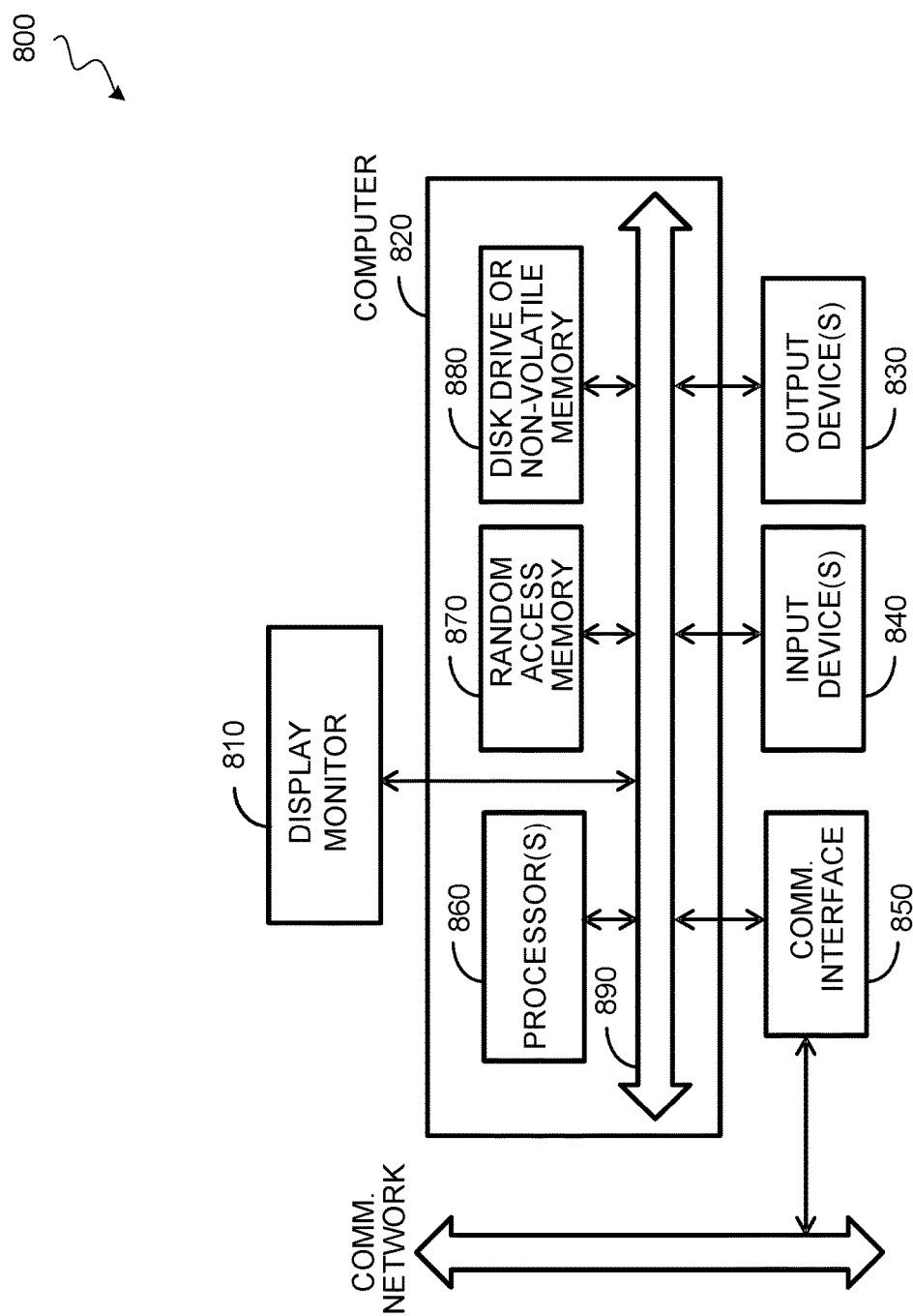
FIG. 8 illustrates a block diagram of a computer system, according to some embodiments.

FIG. 8 illustrates a computer system 800 usable for implementing one or more embodiments of the present disclosure. FIG. 8 is merely an example and does not limit the scope of the disclosure as recited in the claims. As shown in FIG. 8, the computer system 800 may include a display monitor 810, a computer 820, user output devices 830, user input devices 840, a communications interface 850, and/or other computer hardware or accessories. The computer system 800 or select components of the computer system 800 can be used to implement the error correction system 700 of FIG. 7.

As shown in FIG. 8, the computer 820 may include one or more processors 860 that communicate with a number of peripheral devices via a bus subsystem 890. These peripheral devices may include the user output devices 830, the user input devices 840, the communications interface 850, and a storage subsystem, such as a random-access memory (RAM) 870 and a disk drive or non-volatile memory 880.

The user input devices 840 include all possible types of devices and mechanisms for inputting information to the computer 820. These may include a keyboard, a keypad, a touch screen incorporated into the display, audio input devices such as voice recognition systems, microphones, and other types of input devices. In various embodiments, the user input devices 840 are typically embodied as a computer mouse, a trackball, a track pad, a joystick, a wireless remote, a drawing tablet, a voice command system, an eye tracking system, and the like. The user input devices 840 typically allow a user to select objects, icons, text and the like that appear on the monitor 810 via a command such as a click of a button or the like.

The user output devices 830 include all possible types of devices and mechanisms for outputting information from the computer 820. These may include a display (e.g., the monitor 710), non-visual displays such as audio output devices, etc.

The communications interface 850 provides an interface to other communication networks and devices. The communications interface 850 may serve as an interface for receiving data from and transmitting data to other systems. Embodiments of the communications interface 850 typically include an Ethernet card, a modem (telephone, satellite, cable, ISDN), (asynchronous) digital subscriber line (DSL) unit, FireWire interface, USB interface, and the like. For example, the communications interface 850 may be coupled to a computer network, to a Fire Wire bus, or the like. In other embodiments, the communications interfaces 850 may be physically integrated on the motherboard of the computer 820, and may be a software program, such as soft DSL, or the like.

In various embodiments, the computer system 800 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

The RAM 870 and the disk drive 880 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 870 and the disk drive 880 may be configured to store the basic programming and data constructs that provide the functionality of the present disclosure.

Software code modules and instructions that provide the functionality of the present disclosure may be stored in the RAM 870 and the disk drive 880. These software modules may be executed by the processor(s) 860. The RAM 870 and the disk drive 880 may also provide a repository for storing data used in accordance with the present disclosure.

The RAM 870 and the disk drive 880 may include a number of memories including a main random-access memory (RAM) for storage of instructions and data during program execution and a read-only memory (ROM) in which fixed non-transitory instructions are stored. The RAM 870 and the disk drive 880 may include a file storage subsystem providing persistent (non-volatile) storage for program and data files. The RAM 870 and the disk drive 880 may also include removable storage systems, such as removable flash memory.

The bus subsystem 890 provides a mechanism for letting the various components and subsystems of the computer 820 communicate with each other as intended. Although the bus subsystem 890 is shown schematically as a single bus, alternative embodiments of the bus subsystem may utilize multiple busses.

It will be readily apparent to one of ordinary skill in the art that many other hardware and software configurations are suitable for use with the present disclosure. For example, the computer 820 may be a desktop, portable, rack-mounted, or tablet configuration. Additionally, the computer 820 may be a series of networked computers. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, and magnetic and optical storage devices, such as disk drives, magnetic tape, CDs, DVDs, or other media, now known or later developed, that are capable of storing code and/or data. Hardware modules or apparatuses described herein include, but are not limited to, ASICs, FPGAs, dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The embodiments disclosed herein are not to be limited in scope by the specific embodiments described herein. Various modifications of the embodiments of the present disclosure, in addition to those described herein, will be apparent to those of ordinary skill in the art from the foregoing description and accompanying drawings. Further, although some of the embodiments of the present disclosure have been described in the context of a particular implementation in a particular environment for a particular purpose, those of ordinary skill in the art will recognize that the disclosure's usefulness is not limited thereto and that the embodiments of the present disclosure can be beneficially implemented in any number of environments for any number of purposes.

What is claimed is:

1. A method performed by a memory device of a storage device that includes a memory controller coupled to the memory device, the method comprising:
   receiving a garbage collection command from the memory controller to perform a garbage collection operation internally within the memory device;
   attempting to perform the garbage collection operation to internally move valid memory pages from a first memory block to a second memory block to free up the first memory block in response to the garbage collection command; and
   sending an acknowledgement to the memory controller for the garbage collection command,
   wherein attempting to perform the garbage collection operation includes:
      reading data from the valid memory pages in the first memory block;
      comparing a checksum metric of the valid memory pages with a threshold value; and
      based on the comparison, selecting between requesting the memory controller to perform the garbage collection operation and performing the garbage collection operation internally in the memory device by writing the data to the second memory block within the memory device.

2. The method of claim 1, wherein the acknowledgement to the memory controller includes an indication that the garbage collection operation was performed successfully.

3. The method of claim 1, wherein the garbage collection operation is performed internally in the memory device when the checksum metric of the valid memory pages is below the threshold value.

4. The method of claim 3, wherein the checksum metric of the valid memory pages is an average checksum of checksums corresponding to the valid memory pages.

5. The method of claim 3, wherein the checksum metric of the valid memory pages is a maximum checksum of checksums corresponding to the valid memory pages.

6. The method of claim 3, wherein the threshold value is determined based on a number of parity bits in a low-density parity check (LDPC) codeword used by the storage device.

7. The method of claim 1, wherein the memory device requests the memory controller to perform the garbage collection operation when the checksum metric of the valid memory pages is above the threshold value.

8. The method of claim 7, wherein the request is provided in the acknowledgement, and wherein in response to the acknowledgement, the memory controller reads the data from the valid memory pages in the first memory block, performs error correction on the data, and writes the corrected data to the second memory block.

9. A storage device comprising:
   a memory controller comprising an ECC engine, and operable to:
      send a garbage collection command to a memory device to perform a garbage collection operation internally within the memory device; and
   the memory device comprising:
      a plurality of memory blocks; and
      internal garbage collection logic having checksum logic, the internal garbage collection logic operable to:
         receive the garbage collection command from the memory controller;

attempt to perform the garbage collection operation to internally move valid memory pages from a first memory block to a second memory block to free up the first memory block in response to the garbage collection command by reading data from the valid memory pages in the first memory block, comparing a checksum metric of the valid memory pages with a threshold value, and based on the comparison, selecting between requesting the memory controller to perform the garbage collection operation and performing the garbage collection operation internally in the memory device by writing the data to the second memory block within the memory device; and send an acknowledgement to the memory controller for the garbage collection command.

10. The storage device of claim 9, wherein the acknowledgement to the memory controller includes an indication that the garbage collection operation was performed successfully.

11. The storage device of claim 9, wherein the garbage collection operation is performed internally when the checksum metric of the valid memory pages is below the threshold value.

12. The storage device of claim 11, wherein the checksum metric of the valid memory pages is an average checksum of checksums corresponding to the valid memory pages.

13. The storage device of claim 11, wherein the checksum metric of the valid memory pages is a maximum checksum of checksums corresponding to the valid memory pages.

14. The storage device of claim 11, wherein the threshold value is determined based on a number of parity bits in a low-density parity check (LDPC) codeword used by the storage device.

15. The storage device of claim 9, wherein the memory device requests the memory controller to perform the garbage collection operation when the checksum metric of the valid memory pages is above the threshold value.

16. The storage device of claim 15, wherein the request is provided in the acknowledgement, and wherein the memory controller is further operable to:

receive the acknowledgement from the memory device;
read the data from the valid memory pages in the first memory block in response to the acknowledgement;
perform error correction on the data using the ECC engine; and
write the corrected data to the second memory block in the memory device.

17. A storage device comprising:
a memory controller comprising an ECC engine, and operable to:
send a garbage collection command to a non-volatile memory device to perform a garbage collection operation internally within the non-volatile memory device; and
the non-volatile memory device comprising:
a plurality of memory blocks; and
internal garbage collection logic having an internal ECC engine, the internal garbage collection logic operable to:
receive the garbage collection command from the memory controller;
attempt to perform the garbage collection operation to internally move valid memory pages from a first memory block to a second memory block to free up the first memory block in response to the garbage collection command; and
send an acknowledgement to the memory controller for the garbage collection command.

18. The storage device of claim 17, wherein the internal garbage collection logic is operable to:
read data from the valid memory pages in the first memory block;
perform error correction on the data; and
write the corrected data internally to the second memory block.

19. The storage device of claim 18, wherein the internal ECC engine in the non-volatile memory device has an error correction capability that is less than the ECC engine in the memory controller.

* * * * *